(12) United States Patent
Karrai

(10) Patent No.: US 8,570,529 B2
(45) Date of Patent: Oct. 29, 2013

(54) DEVICE FOR POSITION DETECTION

(75) Inventor: Khaled Karrai, Munich (DE)

(73) Assignee: Attocube Systems AG, Munich (DE)

( * ) Notice: Subject to any disclaimer, the term of this patent is extended or adjusted under 35 U.S.C. 154(b) by 540 days.

(21) Appl. No.: 12/662,159

(22) Filed: Apr. 1, 2010

(65) Prior Publication Data

US 2010/0259760 A1 Oct. 14, 2010

Related U.S. Application Data

(63) Continuation of application No. PCT/EP2008/007259, filed on Sep. 4, 2008.

(30) Foreign Application Priority Data

Oct. 4, 2007 (EP) .................................. 07019476

(51) Int. Cl.
*G01B 9/02* (2006.01)
(52) U.S. Cl.
USPC .......................................................... 356/519
(58) Field of Classification Search
USPC .......................................................... 356/519
See application file for complete search history.

(56) References Cited

U.S. PATENT DOCUMENTS

| | | | |
|---|---|---|---|
| 4,309,108 A * | 1/1982 | Siebert ........................... | 356/519 |
| 5,657,405 A | 8/1997 | Fujiwara | |
| 5,956,355 A * | 9/1999 | Swanson et al. ................ | 372/20 |
| 7,187,453 B2 * | 3/2007 | Belleville ....................... | 356/504 |
| 2002/0131048 A1 | 9/2002 | Tayag et al. | |

FOREIGN PATENT DOCUMENTS

| | | |
|---|---|---|
| DE | 42 09 260 A1 | 9/1993 |
| DE | 10 2005 022 876 A1 | 11/2006 |
| GB | 2 317 008 A | 3/1998 |
| JP | 63-222204 A | 9/1988 |
| JP | 6-258018 | 9/1994 |
| WO | WO 2006/127952 A2 | 11/2006 |

OTHER PUBLICATIONS

English Translation of the International Preliminary Report on Patentability mailed May 20, 2010 and issued in corresponding International Patent Application PCT/EP2008/007259.
U. Minoni et al., "A high-frequency sinusoidal phase-modulation interferometer using an electro-optic modulator: Development and evaluation", Review of Scientific Instructions, vol. 62, No. 11, New York, Nov. 1991, pp. 2579-2583.
International Search Report issued on Oct. 15, 2008 in corresponding PCT Application No. PCT/EP2008/007259.

* cited by examiner

*Primary Examiner* — Tarifur Chowdhury
*Assistant Examiner* — Jonathon Cook

(57) ABSTRACT

An apparatus for position finding, including a light source to produce a wave field in a measurement section, a wave field variation device to generate a variation of a wavelength of the wave field over time, an interferometer to produce an interference pattern for the wave field which is dependent on the length of the measurement section, a detector to produce a measurement signal on the basis of the detected interference pattern, and an evaluation circuit to evaluate the measurement signal on the basis of the variation over time.

7 Claims, 7 Drawing Sheets

DEVICE FOR POSITION DETECTION

CROSS-REFERENCE TO RELATED APPLICATIONS

This application is a U.S. Continuation Application claiming priority benefit under 35 U.S.C. Section 111(a), of PCT International Application No. PCT/EP2008/007259, filed Sep. 4, 2008, which claims earlier priority benefit to European Application No. 07019476.6-2213, filed Oct. 4, 2007, the entire disclosures of which are incorporated by reference as a part of this application.

BACKGROUND

The invention relates to an apparatus for position finding, a positioner and an arrangement which has a positioner and a position finding device.

In many areas of application, it is necessary to find the position of an object or a distance covered by said object. By way of example, in conveying and automation technology, positions of objects need to be monitored and evaluated. A specific field of use in which the accuracy of the position finding is of particular importance is positioning engineering, in which an object is moved in a targeted and defined manner. Such positioners are used in research and industry, for example. Besides the maximum possible reproducibility and scalability for paths of movement, properties such as insensitivity toward vibration, robustness and compactness of the design play an essential part in practical use.

It is already known practice to perform position finding by optical means using a Michelson interferometer. FIG. 1 shows the design of a dual Michelson interferometer 4 which is designed for position finding using the quadrature detection method. A laser 1 produces laser light of wavelength $\lambda$ which is routed by means of an optical fibre 2 to the interferometer head 3 of the dual Michelson interferometer 4. The interferometer head 3 has a collimator lens 5, two beam splitters 6-1, 6-2, two reference mirrors 7-1, 7-2 and two detectors 8-1, 8-2. The laser light emerging from the fibre end of the optical fibre 2 is widened into a parallel light beam by means of the collimator lens 5. The parallel light beam passes through the first beam splitter 6-1 and second beam splitter 6-2 and is reflected by a mirror 9. The mirror 9 is located on an object (not shown), the position of which in relation to the x direction (see double arrow) needs to be monitored. The light reflected by the mirror 9 in turn passes through the two beam splitters 6-1 and 6-2, with a portion of the reflected light being reflected onto the detectors 8-1, 8-2 in each case. In this context, a light beam reflected in the beam splitter 6-1, 6-2 to the respective detector 8-1, 8-2 interferes with the light beam reflected by the respective reference mirror 7-1, 7-2. The detectors 8-1, 8-2 sense the intensity of the interference pattern. Each measurement signal oscillates periodically on the basis of the displacement x with a periodicity which is given by half the longitudinal wave $\lambda/2$ of the laser light.

If the reference mirrors 7-1, 7-2 are arranged such that the interval between the mirror planes thereof is increments of $\lambda/8 + N\lambda/2$, where N=0, 1, 2, 3, ..., the function $$s = \cos(4\pi x/\lambda) \quad (1)$$

is obtained for the output signal from the detector 8-1 and the function $$s = \sin(4\pi x/\lambda) \quad (2)$$

is obtained for the output signal from the detector 8-2.

First of all, consideration will be given for the case (not shown in FIG. 1) in which the interferometer head 3 comprises only one interferometer (e.g. comprising the beam splitter 6-1, the reference mirror 7-1 and the detector 8-1). In this case, only the output signal s is provided. This one output signal s is repeated after $\lambda/2$. For many applications, however, it is disadvantageous that determining the displacement path x using this one signal s does not allow determination of the direction of displacement and has an accuracy which varies with x (in the region of the extremes of the cosine function, the displacement path determination is possible with substantially lower accuracy than in the edge regions situated in between).

The method of quadrature detection eliminates these two drawbacks. For this purpose, the signal sQ from the second detector 8-2 is likewise evaluated.

The evaluation of the two signals s and sQ allows both determination of the direction of displacement and constant accuracy for the ascertainment of the displacement path x. The price to be paid for this is that a two-channel measuring arrangement (two Michelson interferometers with two detectors 8-1, 8-2) is required.

Furthermore, the dual Michelson interferometer 4 shown in FIG. 1 cannot be miniaturized. The reason for this is that the beam splitters 6-1, 6-2 and the reference mirrors 7-1, 7-2 need to be provided in a solid and therefore physically relatively large unit in order to avoid losing alignment. The dimensions of the most compact dual Michelson interferometers currently available are typically 10×10×5 cm. Since it is not possible to route the light in the measurement section (i.e. between the mirror 9 and the beam splitters 6-1, 6-2) in an optical fibre (on account of temperature effects and mechanical stress, fluctuations in the optical index of the fibre would occur which are equivalent to changes of length in the measurement section), the interferometer head must always be arranged close by and in a prescribed, defined position relative to the object to be monitored. This means that a large number of applications, e.g. in a relatively small self-contained system, in systems where little space is available or in extreme environments, are not possible, since the interferometer head 3 cannot be arranged outside the self-contained system and the measurement light cannot be routed into the system via an optical fibre.

For these and other reasons, there is a need for the present invention.

SUMMARY

In accordance with one embodiment, the evaluation of the measurement signal comprises demodulation of the measurement signal at a first frequency, which is dependent on the variation over time, and performance of the position finding using the demodulated measurement signal. The demodulation of the (one) measurement signal takes account of the variation of the length measurement over time in the evaluation.

One embodiment comprises demodulation of the measurement signal at a first frequency, which is dependent on the variation over time, demodulation of the measurement signal at a second frequency, which is dependent on the variation over time and is different from the first frequency, and performance of the position finding using the demodulated measurement signals. By demodulating the measurement signal at two different frequencies, position finding can be performed with a high level of accuracy using the quadrature detection method.

An apparatus for position finding may comprise a source for producing a wave field in a measurement section. In addition, the apparatus may have wave field variation device for varying a wavelength of the wave field over time. Furthermore, the apparatus may comprise an interferometer, which produces an interference pattern for the wave field which is dependent on the length of the measurement section, and a detector, which takes the detected interference pattern as a basis for producing a measurement signal. An evaluation circuit evaluates the measurement signal on the basis of the variation over time.

The evaluation circuit may expediently be designed to demodulate the measurement signal at a first frequency, which is dependent on the variation over time, and to demodulate the measurement signal at a second frequency, which is dependent on the variation over time and is different from the first frequency. Such an apparatus can perform position finding using the quadrature detection method, this requiring just one interferometer and just one detector. The two signals required for the quadrature detection method are produced in the evaluation circuit by the two different demodulations of the measurement signal.

In one embodiment, the interferometer may be in the form of a Fabry-Perot interferometer. Fabry-Perot interferometers provide a high potential for miniaturization. Since only one interferometer is needed, even when the quadrature detection method is used, it is possible—unlike in the prior art—to use a Fabry-Perot interferometer.

One arrangement comprises a positioner and an optical position finding device for finding a positioning location for the positioner. The optical position finding device may have a Fabry-Perot interferometer and an evaluation device which is designed to take a measurement signal delivered by the Fabry-Perot interferometer as a basis for determining the positioning location of the positioner using quadrature detection. One advantage of this arrangement is that it is highly miniaturizable on account of the use of a Fabry-Perot interferometer and, on account of the quadrature detection, allows an accurate position finding device which ascertains the direction of displacement of the positioner. This means that such an arrangement is suitable for many kinds of applications in which previously position finding was possible only with a high level of equipment involvement, inaccurately or not at all. By way of example, this arrangement may have a positioner in the sub-millimetre range or in the sub-micron range.

BRIEF DESCRIPTION OF DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DESCRIPTION OF EMBODIMENTS

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 2:
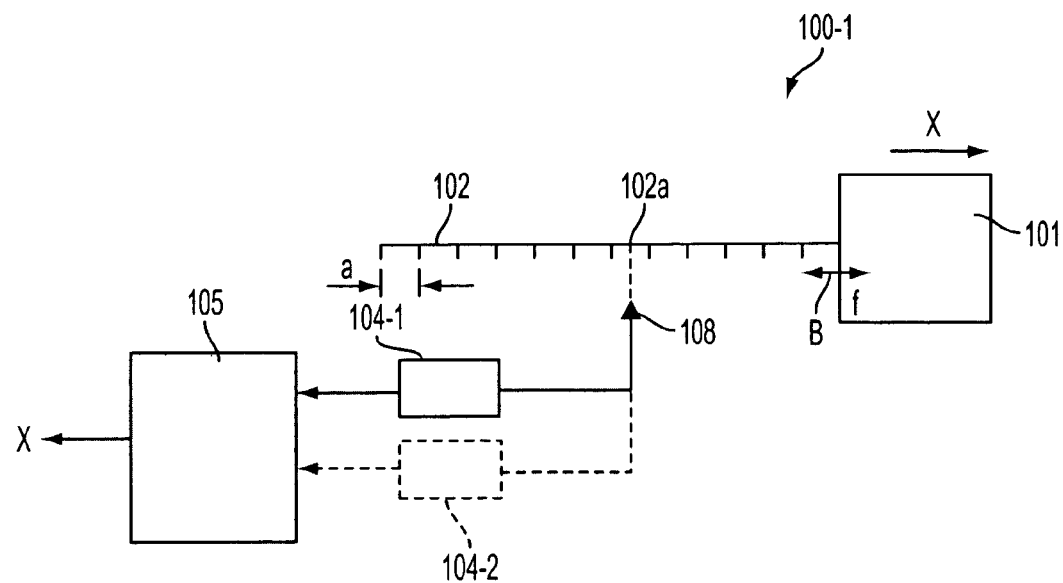
FIG. 2 is a schematic basic illustration of an exemplary embodiment based on a first aspect of the invention.

FIG. 2 shows a basic illustration of a first exemplary embodiment of a position finding apparatus 100-1. An object 101 moves in a direction x. To capture the location or the movement of the object 101, a length measurement 102 is provided. Said length measurement 102 may, as already mentioned, be implemented in a wide variety of ways, e.g. by a wave field or by an article with an impressed measurement pitch. The position finding apparatus 1001-1 comprises a detector 108 which observes the length measurement 102 at a particular location 102a. This may be observed optically or in another way (e.g. including mechanically or by capturing a magnetic field prompted by the measurement, etc.). An output signal from the detector 108 is demodulated in a first demodulator 104-1. The signal produced during the demodulation is supplied to an evaluation unit 105 which outputs a piece of information x relating to the location of or to a distance covered by the object 101. For the case of quadrature detection, the measurement signal output by the detector 108 is also supplied to a second demodulator 104-2. The latter likewise produces a demodulated signal which is supplied to the evaluation unit 105 and is used for evaluation on the basis of the principle of quadrature detection.

In the exemplary embodiment shown in FIG. 2, a length measurement 102 with a measurement width a which is constant over time is considered. The length measurement 102 is meant to move along with the object 101, i.e. translation of the object 101 is transferred to appropriate translation of the length measurement 102. Said translation of the length measurement 102 which is caused by the movement of the object is intended to have an additional movement component overlaid on it which can be described by a periodic—for example—vacillatory movement by the length measurement 102. Said vacillatory movement parallel to the direction of translation is illustrated by the double-headed arrow B. By way of example, the length measurement 102 can oscillate parallel to the direction of displacement x at the frequency f relative to the object 101. In this case, the point 102a observed by the detector 108 on the length measurement 102 is both dependent on the position of the object 101 and dependent on the overlaid vacillatory movement of the length measurement 102. The demodulation in the first demodulator 104-1 and the demodulation in the second demodulator 104-2 take place on the basis of the overlaid periodic movement of the length measurement 102. The demodulation in the demodulators 104-1 and 104-2 takes account of the vacillatory movement at the frequency f in respective different ways, e.g. by virtue of demodulation at the frequency f taking place in the first demodulator 104-1 and demodulation at the frequency 2*f* taking place in the second demodulator 104-2. As a result, the two demodulators 104-1 and 104-2 provide signals demodulated in two different ways, which signals, as explained in more detail below, allow the location of the object 101 to be determined using the principle of quadrature detection. However, it is likewise possible to determine the location of the object 101 (without quadrature detection), specifically when just a single demodulator 104-1 is used for demodulating the measurement signal.

Figure 3:
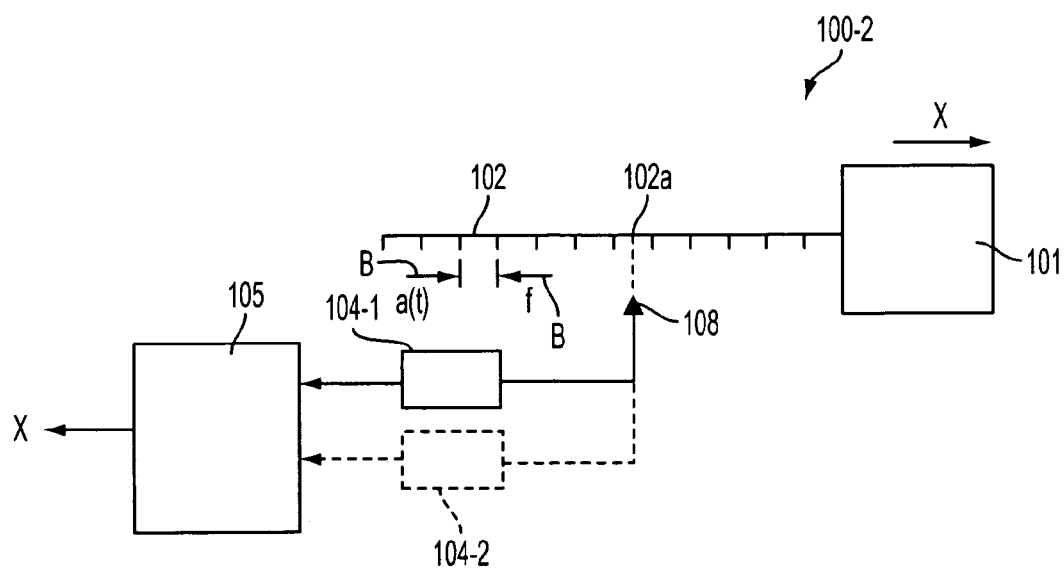
FIG. 3 is a schematic basic illustration of an exemplary embodiment based on a second aspect of the invention.

FIG. 3 shows a basic illustration of a further exemplary embodiment of a position finding apparatus 100-2. The same or similar parts have been denoted by the same reference symbols. The position finding apparatus 100-2 differs from the position finding apparatus 100-1 essentially only in that the translational movement of the length measurement 102 brought about by the object 101 now has a movement component overlaid on it which can be described by a measurement width a(t) which changes over time. The change in the measurement width a(t) over time can likewise be described by a temporally periodic vacillation with a particular amplitude. This vacillatory movement parallel to the direction of translation is illustrated by the two arrows B.

One way of imagining such a length measurement 102 which expands and contracts, so to speak, is that the length measurement 102 comprises an elastic material and is mechanically stretched and contracted. In many cases, a length measurement 102 with a measurement width a(t) which changes periodically, for example, at the frequency f is represented by a wave field of wavelength λ(t), wherein the wavelength λ(t) is modulated at the frequency f, said wave field being produced by a wave field source. As in the case of the first exemplary embodiment 100-1, the point 102*a* observed by the detector 108 on the length measurement 102 is dependent both on the object position x and on the modulation of the length measurement 102. The measurement signal delivered by the detector 108 can be demodulated in the position finding apparatus 100-2 as in the case of the first exemplary embodiment (FIG. 2). In this case too, the location of the object 101 can be detected either by a single demodulator 104-1 or by both demodulators 104-1, 104-2 (for quadrature detection).

In other words, the length measurement 102 can accomplish periodic—for example—relocation of its origin (FIG. 2) and periodic—for example—alteration of the measurement width a(t), see FIG. 3. If the length measurement 102 is produced by a wave field (e.g. electromagnetic wave), the periodic alteration in the position of the length measurement with respect to a reference point over time corresponds to a modulation of the path phase of the wave field for a wavelength which is constant over time, while the periodic alteration in the measurement width of the length measurement over time corresponds to modulation of the wavelength of the wave field. It is also possible to provide both an alteration in the position of the length measurement with respect to a reference point over time and modulation of the measurement width of the length measurement 102. In demonstrative terms, the modulation of the length measurement 102 can prompt the length measurement 102 as a whole to perform a vacillatory movement (FIG. 2) or to accomplish an oscillatory expansion and contraction movement (FIG. 3) or to execute a movement which is overlaid on the translational movement and which is itself an overlay on said two oscillatory forms of movement.

FIGS. 2 and 3 therefore show apparatuses 100-1, 100-2 for position finding which respectively have a length measurement 102 which is applied to a measurement section and a length measurement variation device (not shown explicitly), which produces the movement B, for varying or modulating the length measurement 102 over time. The detector 108 observes the length measurement 102, which is dependent on the length of the measurement section and the variation over time, at a particular, fixed point 102*a* (with respect to the reference system in which the object 101 is moving) and produces the measurement signal. The apparatuses 100-1, 100-2 may have evaluation units 104-1, possibly 104-2 and 105, which evaluate the measurement signal on the basis of the variation in the length measurement 102 over time.

Figure 4:
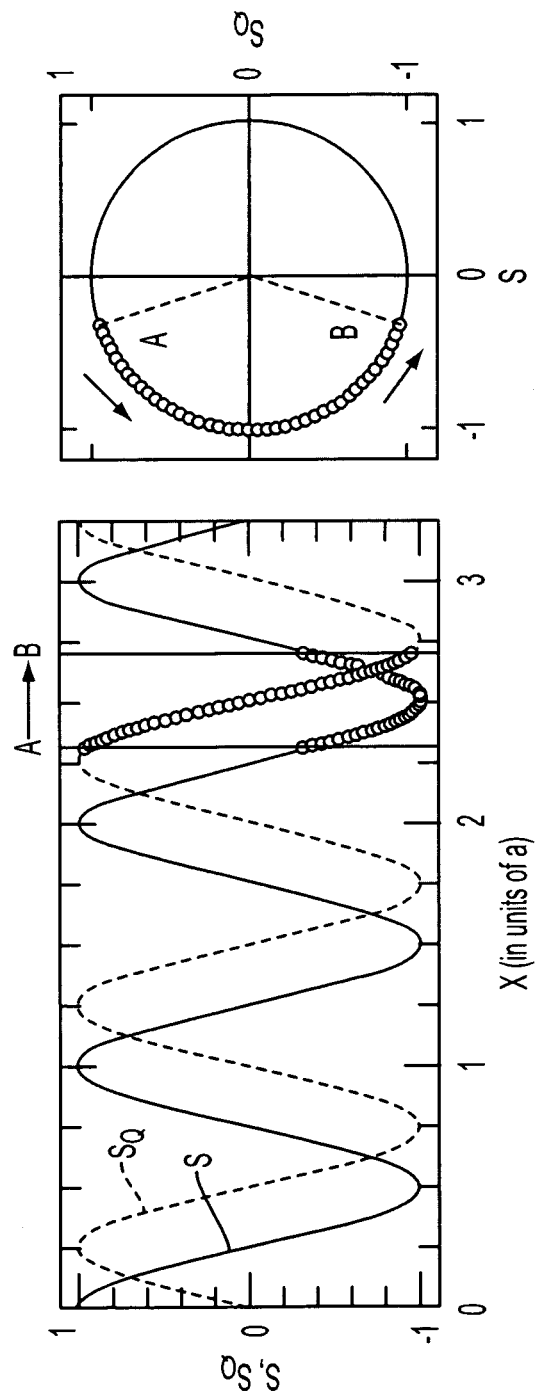
FIG. 4 shows graphs of the signals obtained during quadrature detection and the evaluation of said signals.

FIG. 4 illustrates the principle of quadrature detection using two graphs. The left-hand part of FIG. 4 shows the two signals s and sQ over the path of movement x in units of the measurement width a. Without restricting the general nature, it is subsequently assumed that the modulation at the frequency f of the length measurement is effected with a cosine function. The normalized signal s is then $$s=\cos(kx), \quad (3)$$

where k is related to the measurement width a by virtue of k=2π/a. Such a signal s is repeated at the points at which x is an integer multiple of a, and therefore allows a path displacement x to be measured in integer units of a. For a length measurement produced by a wave field, the measurement width a may be prescribed by the wavelength λ by virtue of the equation $$a=\lambda/2 \quad (4).$$

If only the arithmetic sign of the signal s is considered, displacement paths x can be determined in units of a/2. However, it is not possible to use only the signal s to obtain a piece of information about the direction of the displacement.

However, the direction of displacement can be determined if a signal sQ of the type $$sQ=\sin(kx) \quad (5)$$

is available.

Figure 1:
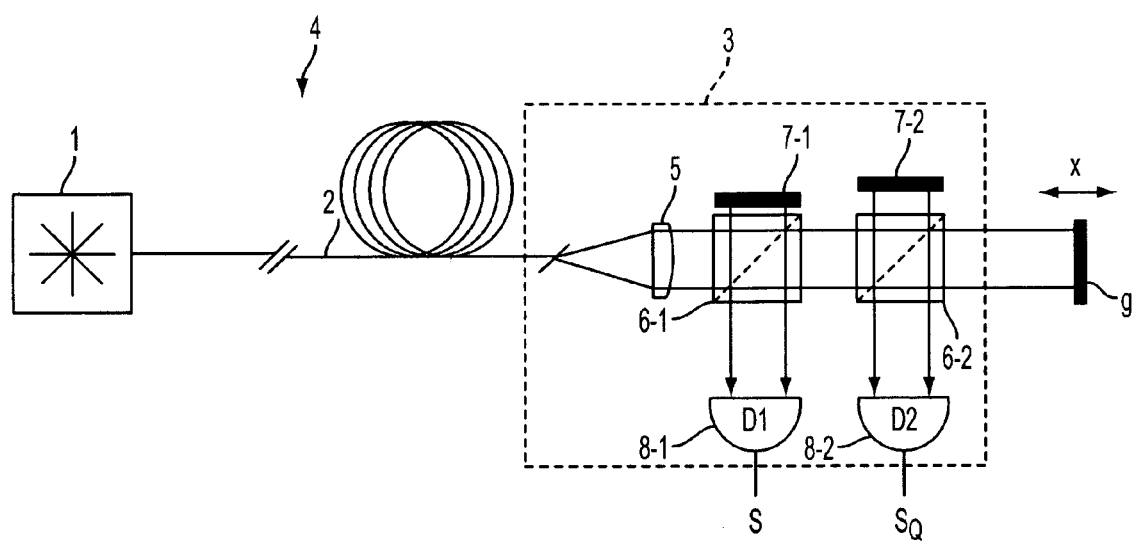
FIG. 1 is a schematic illustration of the design of a known dual Michelson interferometer.

The simultaneous measurement of s and sQ allows the direction of movement to be determined explicitly and the position resolution is improved to increments of a/4, see the left-hand part of FIG. 4. In the case of conventional position finding devices which use quadrature detection, the signal sQ is produced by virtue of the position finding apparatus being equipped with a second measurement channel, with respect to which the length measurement has been displaced relative to the first measurement channel by a distance of (N+¼)a, where N=0, 1, 2, 3, . . . . As shown in FIG. 1, a conventional dual Michelson interferometer has a two-channel design of this kind.

In an increment a/4, a much higher spatial resolution is available. The right-hand side of FIG. 4 shows the signals s and sQ on the x and y axes of an oscilloscope. When the object 101 is moving in the direction of movement x, the point in the oscilloscope moves along a circular orbit. A complete circular orbit is achieved when the path of movement x corresponds to the measurement width a. The direction of rotation of the point in the oscilloscope explicitly indicates the direction of movement of the object. When the object 101 moves in the x direction from a point A to a point B, this results in the point in the oscilloscope moving along a circular section from A to B anticlockwise. Movement by the object 101 from the point B to the point A in the left-hand part of FIG. 4 would bring about a movement by the pixel in the oscilloscope from the point B to the point A clockwise. Furthermore, it becomes clear that the position of the point along the circular orbit allows determination of the object position, the accuracy of which is limited only by the noise in the signals s and sQ. In particular, the accuracy over the displacement path x is constant, i.e. it is not dependent on whether the signal s is close to an extreme or to an edge profile of the cosine function, for example.

The object position x can be obtained by counting the number N of increments a/4 and processing the signals s and sQ in line with the equation $$x = a\left[N + \frac{1}{4} + \frac{1}{2\pi}\arccos\left(\frac{s}{\sqrt{s^2 + s_Q^2}}\right)\right]. \quad (6)$$

The principle of quadrature detection is extended below to length measurements 102 which vary over time. First of all, the situation illustrated in FIG. 2 is considered, in which the measurement width a of the length measurement 102 is constant over time and the position of the length measurement 102 is modulated periodically over time. The normalized signal is $$s = \cos[k(x+x0(t))] + sQ \quad (7).$$

In this case, s0 is an arbitrary, temporally constant background signal for an indefinite zero point and x0(t) denotes the modulation of the zero point by x over time. For the optional specific case of modulation of the useful point by x periodically over time, the expression x0 cos(ωt) is obtained for x0(t), where ω=2πf and f is the modulation frequency. In this specific case, it follows that $$s = \cos[kx + kx0 \cos(\omega t)] + s0$$

and hence $$s = \cos[kx]\cos[kx0\cos(\omega t)] - \sin[kx]\sin[kx0\cos(\omega t)] + s0. \quad (8)$$

If, without restricting the general nature, the text below considers the situation in which the amplitude modulation applied to the zero point of the length measurement is very much smaller than the wavelength λ, i.e. the condition kx0<<1 is satisfied, the expression $$s \square \cos[kx][1-(kx0)2(\cos(\omega t))2/2] - kx0\cos(\omega t)\sin[kx] + s0 \quad (9)$$

is obtained in a second-order approximation for kx0.

Using the relationship (cos(ωt))2=(cos(2ωt)+1)/2, it is possible to write the above relationship as the sum of three terms $$s = sDC + s\omega + s2\omega \quad (10)$$

The first term sDC is a temporally independent DC component which can be written in the following form $$sDC = \cos(kx)(1-(kx0/2)2) + s0 \quad (11)$$

The second term sω is a temporally variable component which describes a periodic oscillation at the modulation frequency f according to $$s\omega = (-kx0\cos(\omega t))\sin(kx) \quad (12),$$

where ω=2πf.

The third term s2ω is likewise a temporally variable component which describes a periodic oscillation at twice the modulation frequency, i.e. 2 f.

$$s2\omega = [-(kx0/2)2\cos(2\omega t)]\cos(kx) \quad (13)$$

The output signal delivered by the detector 108 is now demodulated at the modulation frequency f and twice the modulation frequency 2f. For the demodulation, it is possible to use lock-in amplifiers, for example. The signal s is used to produce, by demodulation at the frequency f, the demodulated signal S according to $$S = -kx0 \sin(kx) \quad (14)$$

and, by demodulation at the frequency 2f, the demodulated signal $$SQ = -(kx0/2)2 \cos(kx) \quad (15).$$

Since the preliminary factors kx0 and (kx0/2)2 are known, the two demodulated signals S and SQ can be processed in the following manner for quadrature detection according to equation (6)

$$x = a\left[N + \frac{1}{4} + \frac{1}{2\pi}\arccos\left(\frac{S}{\sqrt{S^2 + (2S_Q/kx_0)^2}}\right)\right]. \quad (16)$$

In this case too, the position determination can be performed by counting the increments a/4 during the object movement and evaluating the quadrature detection signals, which in this case have been obtained by means of two different demodulations of one and the same measurement signal.

Figure 5:
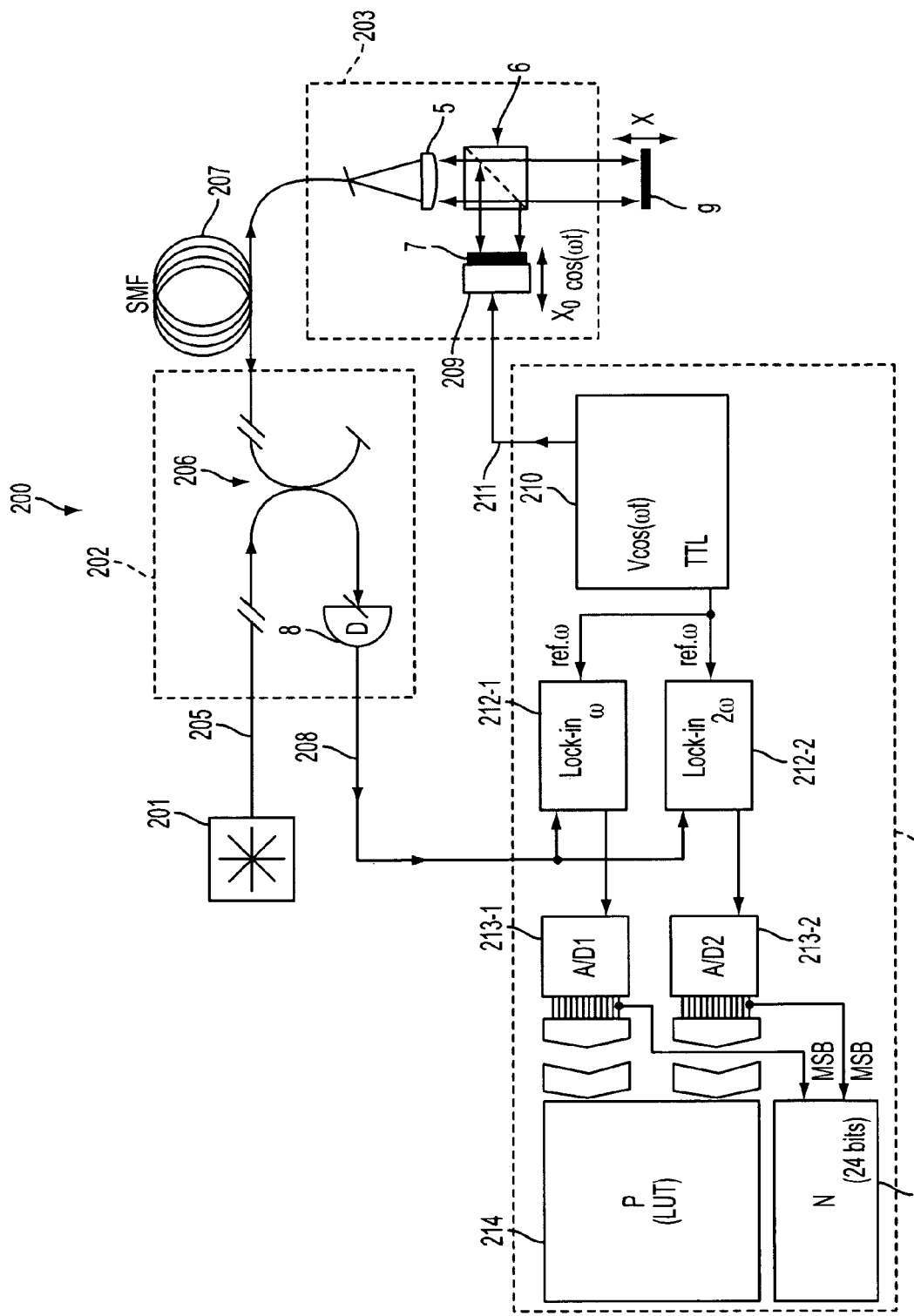
FIG. 5 is a schematic illustration of an exemplary embodiment of the invention.

FIG. 5 shows an exemplary illustration of a position finding apparatus 200 which operates on the basis of the principles explained with reference to FIG. 2 and the above equations. The position finding apparatus 200 comprises a light source, e.g. in the form of a laser 201, a detector arrangement 202, an interferometer head 203 and an electronic evaluation circuit 204. By way of example, the laser 201 may be a laser of fixed wavelength. The laser light is routed into the detector arrangement 202 via an optical single-mode fibre (SMF) 205. A 2×2 fibre coupler 206 is used to route a portion of the laser light as illumination light to the interferometer head 203 via a further SMF 207. By way of example, the interferometer head 203 may, on account of its fibre connection, be positioned in a poorly accessible region, a self-contained system etc. at a distance from the detector arrangement 202.

The interferometer head 203 has an interferometer of the Michelson type. A collimator lens 5 is used to widen the laser illumination light emerging at a polished bevel end of the SMF 207 and to project it onto a beam splitter 6. By way of example, approximately half of the light is sent to a reference mirror 7, while the remaining proportion hits a mirror 9 which is attached to an object (not shown). As already explained with reference to FIG. 1, the position or the displacement path x of the object with respect to a freely selectable zero point x0 needs to be detected in the x direction (see double-headed arrow). The light reflected by the reference mirror 7 and the light reflected by the mirror 9 on the object are returned to the beam splitter 6 and from there routed back into the SMF 207 as measurement light via the collimator lens 5. A further output of the 2×2 fibre coupler 206 has an optical detector 8 connected to it. Said detector 8 receives a portion of the returned measurement light, which interferes at the optically active zone in the detector 8. The detector 8 produces an electrical measurement signal 208 which is dependent on the intensity of the detected interference pattern and varies as a function of the path x with a period provided by λ/2, i.e. half the laser wavelength.

The modulation of the length measurement over time—in this case provided by the wave field of the laser 201—can be produced by virtue of the reference mirror 7 vacillating with an amplitude x0 cos(ωt). Such a modulation of the position of the reference mirror 7 is equivalent to modulation of an origin of the length measurement as shown in the basic illustration in FIG. 2. For this, the reference mirror 7 may be mounted on a small piezoelectric element 209, for example. The piezoelectric element 209 is driven by an AC voltage generator 210 which is in contact with the piezoelectric element 209 via an actuation line 211. The effect of this is that the reference mirror 7 executes an oscillatory movement at the angular frequency w. Since the reference mirror 7 defines the one origin, so to speak, of the length measurement applied to the measurement section, this produces a zero point vacillation in the length measurement shown in FIG. 2.

Besides the AC voltage generator 210, the evaluation circuit 204 may have a first lock-in amplifier 212-1 and a second lock-in amplifier 212-2, a first analogue/digital converter 213-1, a second analogue/digital converter 213-2, a processor 214 with access to a lookup table memory and an up/down counter 215.

The demodulations of the measurement signal 208 at the angular frequency w and the angular frequency 2ω are performed in the lock-in amplifiers 212-1 and 212-2. For this purpose, the reference inputs of the two lock-in amplifiers 212-1, 212-2 are connected to a TTL reference output of the AC voltage generator 210. The measurement signal 208 which is output at the output of the detector 8 is supplied to the signal inputs of the two lock-in amplifiers 212-1 and 212-2 via the measurement signal line. The first lock-in amplifier 212-1 is adjusted to the reference angular frequency ω and the second lock-in amplifier 212-2 is adjusted to twice the reference angular frequency 2ω. The first lock-in amplifier 212-1, which is operated in sync with ω, produces a demodulated signal S which is proportional to $\sin(4\pi x/\lambda)$, and the second lock-in amplifier 212-2, which operates in sync with the angular frequency 2ω, delivers a quadrature detection signal SQ, which is proportional to $\cos(4\pi x/\lambda)$. The two output signals from the lock-in amplifiers 212-1, 212-2 are converted into digital signals by the analogue/digital converters 213-1, 213-2. First reading at the output of the analogue/digital converters 213-1, 213-2 provides the displacement path x in increments of λ/8. For this purpose, the most significant bit MSB at the output of each analogue/digital converter is respectively routed to a counting input of the up/down counter. Since in this case the measurement width is a=λ/2, the position x is ascertained by the closest increment xN according to $$x_N = \frac{\lambda}{2}\left(N + \frac{1}{4}\right). \tag{17}$$

By way of example, the counter 215 used may be a 24-bit counter with two counting inputs.

For the calculation of δx within an increment λ/8, second reading of the outputs of the analogue/digital converters 213-1, 213-2 is performed by the processor 214. This second reading can extend over the entire word length of the converter outputs. An interpolator contained in the processor 214 handles the two demodulated signals S and SQ and determines λx according to the following equation:

$$\delta x = \frac{1}{4\pi}\arccos\left(\frac{S}{\sqrt{S^2 + (2S_Q/(4\pi x_0/\lambda))^2}}\right). \tag{18}$$

The object position x is then ascertained by means of the sum of the output of the up/down counter 215 and the interpolator in the processor 214 according to $$x = xN + \delta x \tag{19}$$

The interpolation can be performed using a lookup table memory (LUT), for example.

It should be pointed out that the interferometer head 203 of the position finding apparatus 200 can be produced much smaller than the interferometer head 3 of the position finding apparatus 4 shown in FIG. 1. This is firstly due to the fact that only one interferometer is accommodated in the interferometer head 203. In addition, the detector 8 may be arranged outside the interferometer head 203 and may be connected to the interferometer head 203 by means of an optical fibre 207, for example. This is not possible in the case of the dual Michelson interferometer shown in FIG. 1.

The text below considers the situation in which the object position x is ascertained by modulating the measurement width a(t) over time. As already mentioned in connection with FIG. 3, the modulation of the measurement width a(t) over time is particularly feasible for length measurements 102 in the form of wave fields. However, the principle can also be applied to length measurements 102 which are produced by a material, elastic length measurement element.

The text below considers the special case, without limiting the general nature, in which k is modulated using periodic cosine modulation according to $k=k0+\delta k\cos(\omega t)$. By way of example, the modulation of the photon frequency of an electromagnetic wave field causes modulation of k. A derivation which is very similar to the derivation performed in equations 7 to 10 results in the normalized measurement signal s being able to be specified by the sum of terms $$s = sDC + s\omega + s2\omega \tag{20}$$

The term sDC is a temporally independent component and is obtained as $$sDC = \cos(k0x)(1-(x\delta k/2)2) + s0 \tag{21}$$

The second term sω is a temporally dependent component which accomplishes a periodic oscillation over time at the modulation frequency f according to $$s\omega = (-x\delta k\cos(\omega t))\sin(k0x) \tag{22}$$

where $\omega = 2\pi f$. The third term s2ω is likewise a component which is variable over time and which is a periodic oscillation at twice the modulation frequency, i.e. 2 f, $$s2\omega = (-(x\delta k/2)2\cos(2\omega t))\cos(k0x) \tag{23}$$

As already described, the two components which vary over time are demodulated at the frequency f and the frequency 2f. The demodulated signals obtained by means of the demodulation are proportional to $$S = -x\delta k\sin(k0x) \tag{24}$$

and $$SQ = -(x\delta k/2)2\cos(k0x) \tag{25}$$

These two demodulated signals can be taken as a basis for quadrature detection for the position and movement detection of the object 101.

Unlike when the origin of the length measurement 102 is modulated in accordance with FIG. 2, the preliminary factors xδk and (xδk/2)2 are unknown, since they are dependent on the object location or the displacement path x, i.e. the sought value. The orbits (what are known as Lissajou figures) formed by the demodulated signals S and SQ on an oscilloscope are now ellipses, the ratio of diameters of which is given by the expression xδk/4. The ratio of the diameters of the ellipse is therefore linearly dependent on the magnitude x. Besides the determination of x by increment counting and interpolation which is explained in more detail below, this allows a further approach in determining the magnitude x in the form of an absolute value.

This absolute-value determination of the magnitude x (with respect to the zero point x0) has limited accuracy. By way of example, it can be achieved by virtue of the object 101 being moved over a measurement width a (i.e. a half-wavelength of a light field, for example) in order to ascertain the full periodicity of the demodulated signals S and SQ. In this way, it is possible to determine maximum values max(SQ) and max(S) for the signals SQ and, and the magnitude x can then be ascertained with respect to the zero point x0 of the length measurement from the ratio of the signal magnitudes by approximation according to xestim □(2/δk)(max(SQ)/max(S)). Alternatively, it is also possible to record the zero point x0 of the length measurement and to vary the measurement width of the length measurement (or the wavelength of the wave field) in order to track the full periodicity of the demodulated signals S and SQ and in this way to ascertain the maximum values max(SQ) and max (S). In this case, the object 101 does not need to be displaced in order to ascertain the absolute position thereof.

In the vicinity of a position xestim ascertained in this manner, it is possible to obtain a higher degree of accuracy by evaluating the quadrature detection signals S □-xestimδk sin(k0x) and SQ □-(xestimδk/2)2 cos(k0x). Using these quadrature detection-demodulated terms, the position x is obtained with an accuracy which is much lower than the measurement width (or half-wavelength) as $$x = \lambda \left[ N + \frac{1}{4} + \frac{1}{2\pi} \arccos\left( \frac{S}{\sqrt{S^2 + (2S_Q / x_{estim}\delta k)^2}} \right) \right]. \quad (26)$$

In this case, N denotes the count for the increments of a/2 (or λ/4) which has been obtained during a displacement x.

Figure 6:
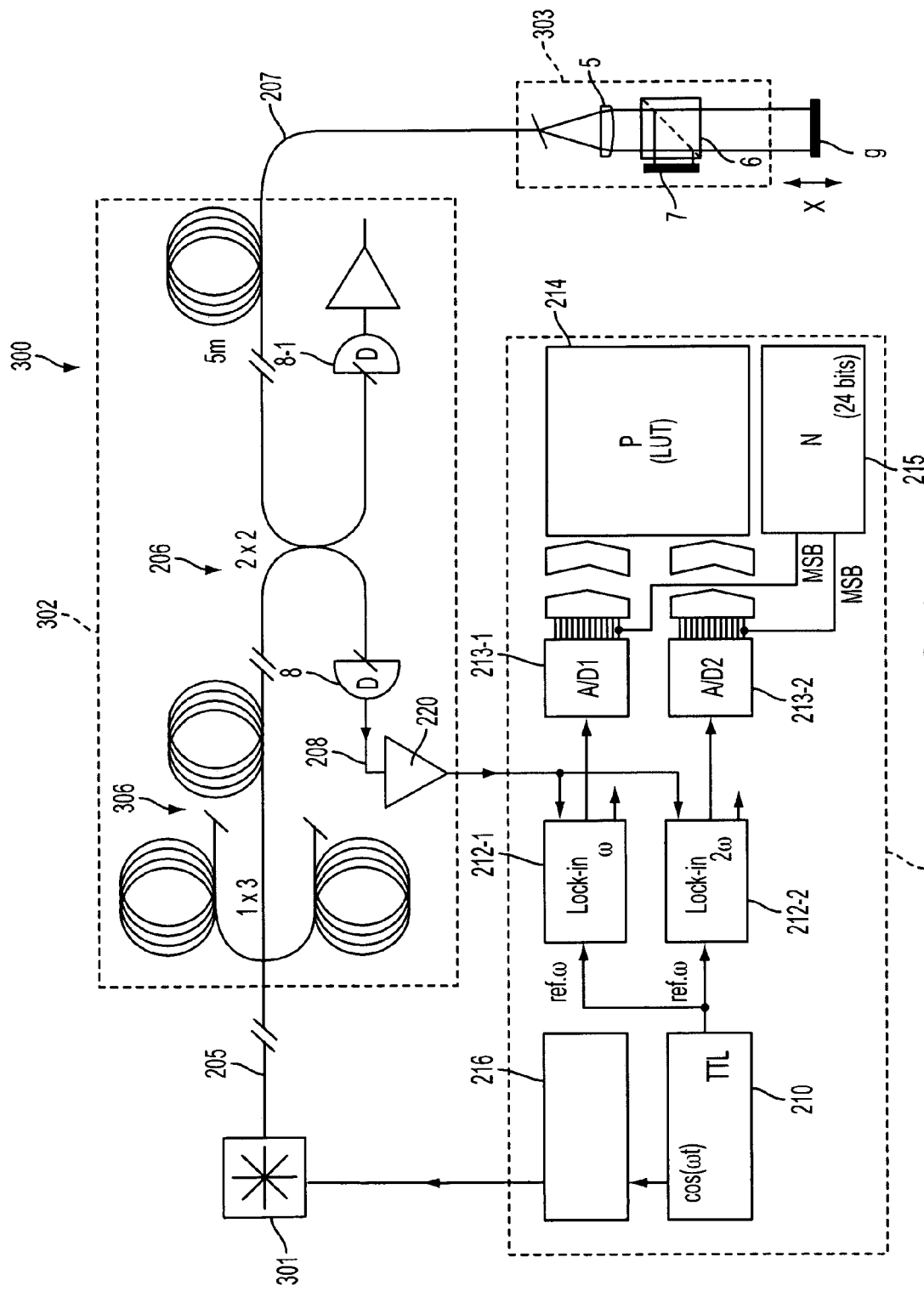
FIG. 6 is a schematic illustration of an exemplary embodiment of the invention.

FIG. 6 shows a position finding apparatus 300 based on a further exemplary embodiment of the invention. The position finding apparatus comprises a tunable light source which is in the form of a tunable laser 301, for example, a detector arrangement 302, an interferometer head 303 and an evaluation circuit 304. Components which are the same or similar to those in the preceding figures are denoted by the same reference symbols. The laser light produced by the tunable laser 301 is routed to the detector arrangement 302 via an SMS 205. The input side of the detector arrangement 302 may have a 1×M coupler 306 which provides M independent laser outputs which offer the same wavelength modulation. If the object movement is monitored in three dimensions, for example, M=3 can be chosen. In this case, two further interferometric position finding apparatuses can be connected to the two free outputs of the 1×3 coupler 306.

One of the outputs of the 1×M coupler 306 is routed to the 2×2 coupler 206. As already described in connection with the position finding apparatus 200, the one output of the 2×2 coupler 206 has a bevel end coupled to the interferometer head 303 via an SMF 207. The interferometer head 303 is identical to the interferometer head 203 with the exception that the reference mirror 7 in the interferometer head 303 is mounted at a fixed location. To avoid repetition, reference is made to the description of the interferometer head 203.

The light returned by the interferometer head 303 via the SMF 207 interferes in the manner already described in the detector 8. In line with the preceding description, the detector 8 produces a measurement signal 208 which, following optional amplification in an amplifier 220, is routed to the evaluation circuit 304. The evaluation circuit 304 is of identical design to the evaluation circuit 204 in the position finding apparatus 200 in terms of the AC voltage generator 310, the lock-in amplifiers 212-1 and 212-2, the analogue/digital converters 213-1, 213-2, the processor 214 and the up/down counter 215. In addition, however, the evaluation circuit 304 comprises a laser driver 216 which simultaneously controls the temperature of the tunable laser 301. An input of the laser driver 216 is in contact with the signal output of the AC voltage generator 210. An output of the laser driver 216 is connected to a tuning input of the tunable laser 301. The tunable laser 301 may be a DFB (Distributed Feedback) laser, for example, which operates at a central frequency of 1500 nm, for example. The laser 301 is isolated by using a Faraday isolator, e.g. at 35 dB, in order to prevent it from being damaged by reflected light or becoming unstable. The laser driver 216 is used to prompt the tunable laser 301 to perform wavelength modulation according to λ=λ0+δλ cos(ωt). Since the measurement width a of a Michelson interferometer is provided by λ/2, this longitudinal wave modulation modulates the measurement width a(t) of the length measurement 102 represented by the wave field in the interferometer head 303 at the angular frequency ω.

The signal processing in the evaluation circuit 304 takes place in a similar manner to the signal processing in the evaluation circuit 204. To avoid repetition, reference is made to the preceding description. The demodulated output signal from the first lock-in amplifier 212-1 provides a signal S=−xδk sin(k0x). The demodulated output signal from the second lock-in amplifier 212-2 provides a quadrature detection signal SQ according to SQ=−(xδk/2)2 cos(k0x). Under the optional condition δ<<λ0, the factor δk can be approximated by the expression condition δk=−πδλ/(λ0)2 from a Michelson interferometer with modulated wavelength. Both the output S and the output SQ are converted into digital data values by the analogue/digital converters 213-1 and 213-2 in the manner already described. In a similar fashion to the description of the evaluation circuit 204, reading of the MSBs determines the count N, which approximates the sought magnitude x by means of xN according to equation 17 with an incremental accuracy of λ/8. The magnitude δxobtained by interpolating the demodulated signals S and SQ is in turn obtained according to equation 18. The position x comes from the sum of the incremental approximation and the interpolation calculation according to Equation 19.

The position finding apparatus 300 shown in FIG. 6 has an interferometer head 303 without moving parts, which is furthermore able to be connected to the detector arrangement 302 via an optical fibre such as SMF 207. As a result, the position finding apparatus 300 is miniaturizable and can be used for many and diverse purposes, including those cited and others.

It should be pointed out that the detector arrangement 302 may comprise a further detector 8-1, the output signal from which is evaluated in another way. Furthermore, the processor 214 can perform (coarse) determination of the absolute value of the magnitude x. This merely requires the maximum signal amplitudes of the two demodulated signals S and SQ to be linked.

It should also be pointed out that in certain fields of application it may be sufficient to coarsely determine the absolute value of the object position x. In this case, it is possible to dispense both with the interpolative evaluation in the processor 214 and with the incremental evaluation in the counter 215. In addition, it is also possible to dispense with the interpolation performed in the processor 214 and to determine the object position solely from the incremental magnitude xn.

Figure 7:
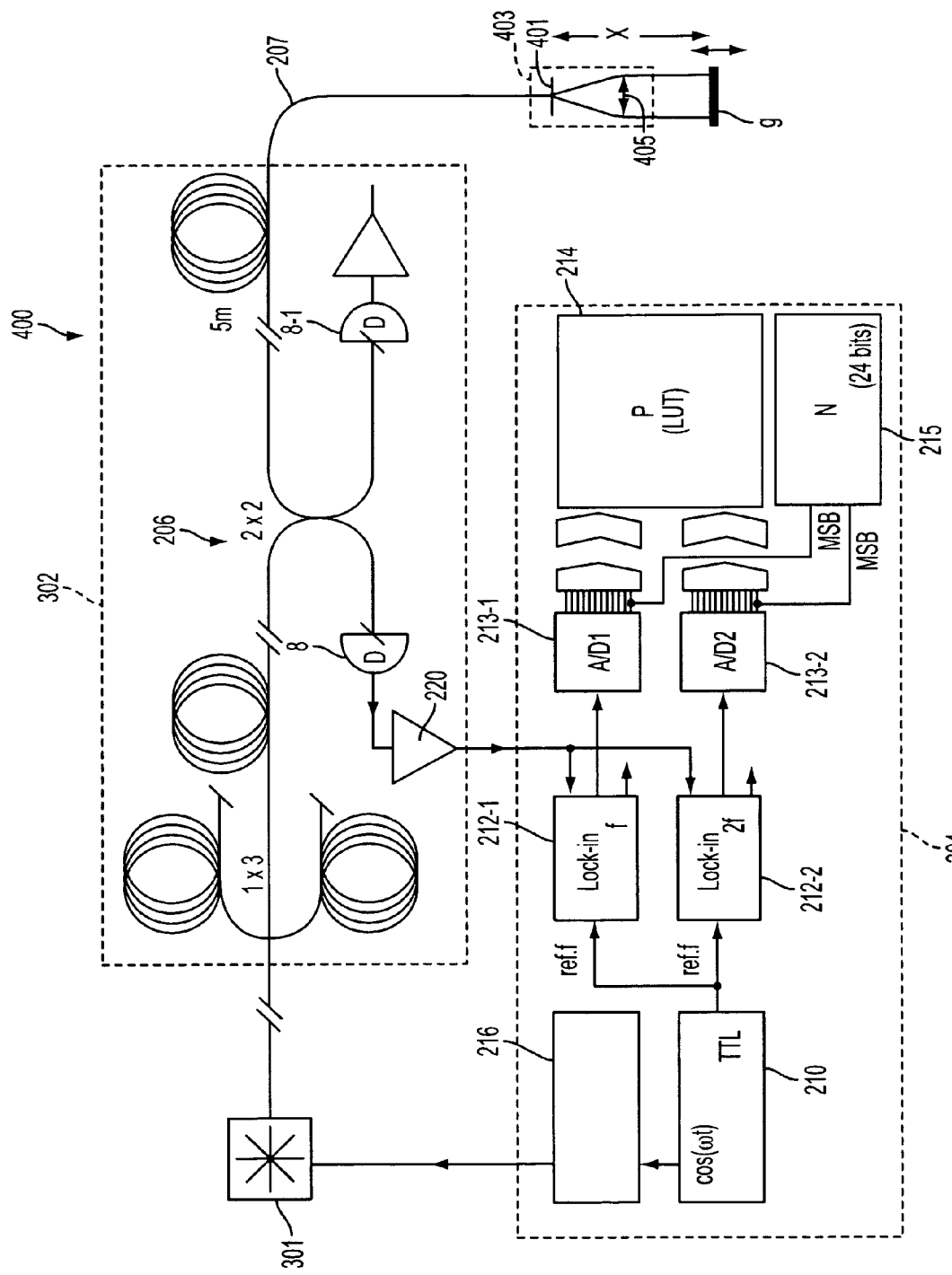
FIG. 7 is a schematic illustration of an exemplary embodiment of the invention.

FIG. 7 shows a position finding apparatus 400 based on a further exemplary embodiment. The position finding apparatus 400 may differ from the position finding apparatus 300 merely in that instead of the Michelson interferometer head 303 a Fabry-Perot interferometer head 403 is used. Otherwise, the components already described (tunable laser 301, detector arrangement 302, evaluation circuit 304) can be used. To avoid repetition, reference is made to the associated description.

The interferometer head 403 comprises a Fabry-Perot interferometer which comprises two mirrors 401, 9 between which an optical resonator is set up. As will be explained in more detail below, a Fabry-Perot interferometer with low finesse may be desired. Such a Fabry-Perot interferometer can easily be implemented by using a planar polished end 401 of the optical fibre (SMF 207) as one of the mirrors of the Fabry-Perot interferometer. The light path after said mirror 401 may contain a collimator lens 405. The second mirror 9 of the Fabry-Perot interferometer may be attached to the object to be monitored (not shown). The measurement section is contained in the resonator, i.e. between the two mirrors 401 and 409.

To achieve low finesse, at least one of the mirrors 401, 409 may have low reflectance. Typically, the reflectance of a planar polished end of an optical fibre is in the region of 4% and therefore has the desired low reflectivity. Another option is to equip the mirror 9 associated with said object with low reflectance. In some cases, it is simply possible to use the light reflected by a surface of the object.

The intensity of the reflected light on the detector 8 is proportional to the reflectance of the Fabry-Perot interferometer, which is defined by the expression $$\text{Reflectance} = \frac{g^2 \sin^2(2\pi x/\lambda)}{1 + g^2 \sin^2(2\pi x/\lambda)}. \quad (27)$$

The finesse $F=(\pi g/2)^{1/2}$ is determined by $g2=4R/(1-R)2$. R denotes the effective reflectance, which is obtained from the reflectance R1 of the mirror 401 and the reflectance R2 of the mirror 9 according to $R=(R1\ R2)^{1/2}$. If $g2\ll 1$, the denominator can be ignored in a first approximation and the reflectance satisfies the following proportionality reflectance $g2 \sin 2(2\pi x/\lambda),(g2\ll 1)$ which is equivalent to reflectance $g2(1-\cos(4\pi x/\lambda))/2$ \quad (28).

The detector 8 therefore measures a signal with a varying component $\cos(kx)$ where $k=4\pi/\lambda$, i.e. with a measurement width $\lambda/2$. This is identical to the measurement width of a Michelson interferometer as shown in FIG. 6, i.e. the signal evaluation can take place in exactly the same way as was described in relation to FIG. 6. All details, particularly including in respect of the option of determining an absolute value for the object position x by means of amplitude comparison of the demodulated signals S and SQ, apply equally to the position finding apparatus 400. The finesse F of the Fabry-Perot interferometer may therefore be less than 10.0, 5.0, 1.0 or 0.5, for example. The higher the value of the finesse, the more difficult the signal evaluation becomes, since the trajectories on the oscilloscope differ to an ever greater extent from the elliptical shape as finesse increases. This results in position errors or in significantly increased complexity for the signal evaluation.

The interferometer head 403 has an extremely simple design and is highly miniaturizable. A multiplicity of new fields of use are opened up, particularly for highly accurate position measurement in small-design positioners in self-contained systems.

Figure 8:
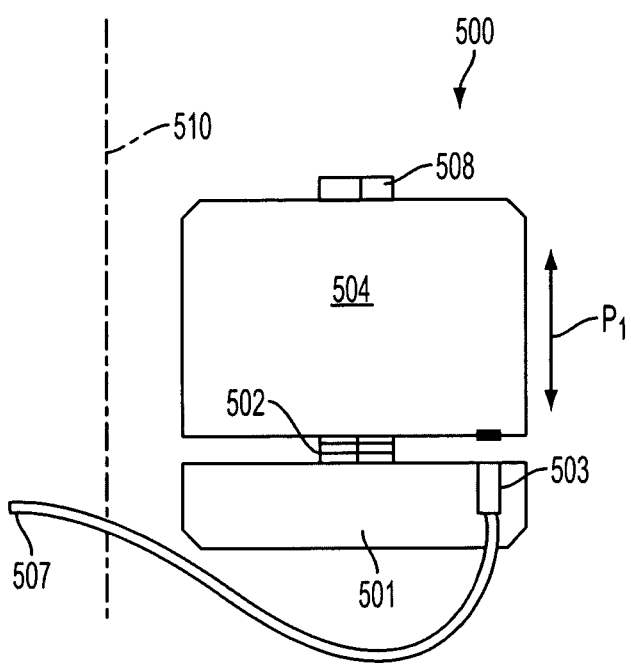
FIG. 8 is a schematic illustration of a positioner for a translational movement.

The position finding device can be used, by way of example, for monitoring the positioning movement of such a positioner with a positioning accuracy in the sub-millimetre range or in the submicron range. FIG. 8 shows a plan view of a positioner 500 for translational movements with a position finding device based on the invention. The positioner 500 has a first, fixed-position part 501 and a second part which can be displaced relative to the first part 501 and which is subsequently referred to as the carrier 504. A relative position adjusting device acts between the first part 501 and the carrier 504, said device being able to be implemented, by way of example, by a translational axis 508, on which the carrier 504 can slide, and a piezoelectric element 502 acting as an actuator. The direction of the translational movement is illustrated by a double-headed arrow P1.

The drive illustrated here is referred to as an "inertia motor" or else as a slip-stick drive. In slip-stick drives, but also in other types of design, the step size of a positioning movement cannot be defined exactly by means of the actuation of the drive. This means that it is not possible to determine a location for a positioning part arranged on the carrier 504 in the positioner 500 solely by monitoring the drive control (e.g. step counting), but rather that the positioner 500 additionally needs to be equipped with an apparatus which allows the positioning location to be monitored.

For this purpose, a position finding device based on one of the preceding exemplary embodiments is provided. The fixed-location first part 501 has an interferometer head 503 mounted on it which may be designed in accordance with one of the preceding exemplary embodiments. The illumination light emerging from said interferometer head 503 hits a mirror 509 which is attached to the displaceable carrier 504 and which is oriented at right angles to the direction of movement (double-headed arrow P1) and reflects the light back to the interferometer head 503. The interferometer head 503 is connected by means of an optical fibre 507 to a detector arrangement (not shown) which may be designed in accordance with one of the preceding exemplary embodiments and is in contact with the further components described previously (laser, evaluation circuit).

The dash-dot line 510 represents a system boundary, as may be implemented by a wall of a cryostat or another container, for example. It becomes clear that only the interferometer head (without detector elements) needs to be accommodated within the self-contained system and—as shown in FIG. 8—can also be integrated into a component of the positioner 500. This means that the positioner 500 can be used in extreme environments such as low temperature, ultra high vacuum (UHV) or high electrical or magnetic fields in which the functionality of known positioners is frequently not preserved in the desired manner.

In the case of the translational positioner 500, it is possible to achieve an optical resolution of less than 5 nm, for example. The step size can be varied between approximately 5 nm and 1 μm on the basis of the voltage actuating the piezoelectric element 502 and on the basis of the temperature. On account of the high resolution of the optical location monitoring, it is thus possible to achieve a positioning accuracy in a region of the mechanical boundaries of the drive (for example 5 nm). Particularly advantageous for many applications is the long maximum path of movement, which may usually be from several millimetres to one or more centimetres.

It should be pointed out that the above exemplary embodiments are exemplary and that the disclosure content of this specification also covers the combinations of features which are described in different exemplary embodiments, provided that this is technically possible. In addition, all details relating to the exemplary embodiments of FIGS. 2 to 4, which are described with little detail, can be applied to the exemplary embodiments described in more detailed form with reference to FIGS. 5 to 8. Vice versa, it is true that the exemplary embodiments described in FIGS. 2 to 4 can have details added which are described in the exemplary embodiments explained with reference to FIGS. 5 to 8.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A positioner, comprising:
a first fixed-position part;
a second movable part that is configured to be displaced relative to the first fixed-position part;
a position adjusting device, acting between the first fixed-position part and the second movable part, to displace the second movable part relative to the first fixed-position part, the position adjusting device comprising a slip-stick drive and being configured to displace the second movable part relative to the first fixed-position part over a path length of at least several millimeters; and
a Fabry-Perot interferometer, wherein an interferometer head of the Fabry-Perot interferometer is mounted on the first fixed-position part and light emitted from the interferometer head is reflected back to the interferometer head from the second movable part, and wherein a finesse of the Fabry-Perot interferometer is less than 10.0, particular less than 5.0, more particular less than 1.0 or still more particular less than 0.5.

2. The positioner of claim 1, further comprising:
an optical fiber connected to the interferometer head, wherein the Fabry-Perot interferometer has an optical resonator comprising two mirrors, one mirror being formed by an end of the optical fiber and the other mirror being associated with the second movable part.

3. An arrangement, comprising:
a positioner, the positioner including:
a first fixed-position part;
a second movable part that is configured to be displaced relative to the first fixed-position part; and
a position adjusting device, acting between the first fixed-position part and the second movable part, the position adjusting device comprising a slip-stick drive and being configured to displace the second movable part relative to the first fixed-position part over a path length of at least several millimeters; and
a position finding device to monitor the positioning movement of the positioner, the position finding device including:
a light source to produce a wave field in a measurement section of the positioner;
a wave field variation device to generate a variation of a wavelength of the wave field over time;
a Fabry-Perot interferometer to produce an interference pattern for the wave field which is dependent on the length of the measurement section;
a detector to produce a measurement signal on the basis of the detected interference pattern; and
an evaluation circuit to evaluate the measurement signal on the basis of the variation over time.

4. The arrangement of claim 3, further comprising a cryostat, wherein the positioner and the Fabry-Perot interferometer is contained within the cryostat, and the light source, the wave field variation device, the detector and the evaluation circuit are arranged outside the cryostat.

5. The arrangement of claim 3, wherein the optical resolution of monitoring the positioning movement of the positioner is less than 5 nm.

6. The arrangement of claim 3, wherein a finesse of the Fabry-Perot interferometer is less than 10.0, particular less than 5.0, more particular less than 1.0 or still more particular less than 0.5.

7. The arrangement of claim 3, wherein the Fabry-Perot interferometer has an optical resonator comprising two mirrors, one mirror being formed by an end of an optical fiber connected to an interferometer head of the Fabry-Perot interferometer, the interferometer head being connected to the first fixed-position part, and the other mirror being associated with the second movable part.

* * * * *